United States Patent Office 3,523,928
Patented Aug. 11, 1970

3,523,928
COPOLYMERS OF BICYCLO[1.1.0]BUTANES
Elwood P. Blanchard, Jr., Wilmington, Del., assignor to E. I. du Pont de Nemours and Company, Wilmington, Del., a corporation of Delaware
No Drawing. Continuation-in-part of application Ser. No. 601,325, Dec. 13, 1966. This application May 29, 1968, Ser. No. 732,885
Int. Cl. C08f 17/00
U.S. Cl. 260—80   16 Claims

ABSTRACT OF THE DISCLOSURE

Copolymers of bicyclo[1.1.0]butanes and polymerizable ethylenically unsaturated monomers which are produced by free-radical, cationic, anionic or coordination-type initiators are useful for preparing self-supporting films, coatings, shaped objects and fibers.

CROSS-REFERENCE TO RELATED APPLICATIONS

This application is a continuation-in-part of my copending applications Ser. No. 601,325, filed Dec. 13, 1966 now abandoned; Ser. No. 560,123, filed June 24, 1966 now abandoned; Ser. No. 475,573, filed July 28, 1965 now U.S. Pat. No. 3,393,159; and Ser. No. 700,379, filed Jan. 25, 1968 now abandoned.

FIELD OF THE INVENTION

This invention relates to a new class of copolymers.

SUMMARY OF THE INVENTION

This invention is directed to copolymers comprising (1) from 1–99 mole percent of at least one cyclobutylene recurring unit of the formula

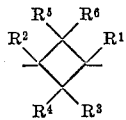

wherein:
$R^1$ and $R^2$ each are selected from hydrogen, halogen, hydroxyloweralkyl, hydroxyphenyl, loweralkoxyloweralkyl, loweralkoxyphenyl, haloloweralkyl, halophenyl, —COOH, —COOR, —COSR, —COOM, —CONH$_2$, —CONHR, —CONR$_2$, —SO$_2$R, —CHO, —COR, —OCOR, —OR, —NO$_2$, —CN, or —R wherein M is one equivalent of a metal cation and R is hydrocarbyl of up to 18 carbon atoms free of ethylenic and acetylenic carbon-to-carbon unsaturation; and
$R^3$, $R^4$, $R^5$ and $R^6$ are each selected from hydroxy, amino, —NR$_2$, or $R^1$; and
(2) the remainder being at least one repeating unit of the formula

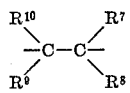

wherein $R^7$ is defined the same as $R^1$; $R^8$ is selected from hydrogen, halogen, cyano, vinyl, methylpyridinyl, phenylene sodium sulfonate, or lower alkyl; $R^9$ is selected from hydrogen, halogen or —COOR where R is defined as previously; $R^{10}$ is selected from hydrogen or halogen; when $R^7$ and $R^{10}$ are hydrogen, $R^9$ and $R^8$ taken together can be joined to form an alkylene group of 2–4 carbon atoms or a 1,3-cyclopentylene group; and when $R^7$ and $R^8$ are hydrogen or methyl, $R^9$ and $R^{10}$ taken together can be joined to form a group of the formula

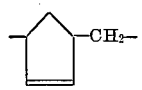

These copolymers are produced by the copolymerization, in the presence of a free-radical, anionic, cationic or coordination catalyst, of 1–99 mole percent of a bicyclo[1.1.0]butane of the formula

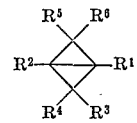

wherein $R^1$, $R^2$, $R^3$, $R^4$, $R^5$ and $R^6$ are as defined above with one or more ethylenically unsaturated comonomers that undergoes addition polymerization in the presence of a free-radical polymerization initiator of the formula

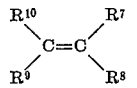

wherein $R^7$, $R^8$, $R^9$ and $R^{10}$ are as defined above.

These copolymers are useful for preparing self-supporting films, as fibers and as shaped objects.

DESCRIPTION OF THE PREFERRED EMBODIMENTS

In the copolymers of this invention, the amount of polymerized ethylenically unsaturated comonomer can be as high as 99 mole percent (i.e., as low as one mole percent polymerized bicyclobutane). Preferably, the copolymers contain a maximum of 99 mole percent and a minimum of 50 mole percent. Alternatively, it may be said that the copolymers of this invention may be comprised of 1–99 mole percent polymerized bicyclobutane and preferably 1–50 mole percent. The copolymers generally have an inherent viscosity of 0.5 or more. Included within the definition of copolymers are terpolymers, and higher multicomponent copolymers containing 1, 2, 3, 4, 5, or more comonomers in addition to a bicyclo[1.1.0]butane monomer.

The copolymers of this invention are prepared by reacting at least one bicyclobutane monomer with at least one unsaturated polymerizable monomer defined as above in bulk, dispension, emulsion or in solution in an inert organic solvent at a temperature of −100° to 160° C. in the presence of an initiator selected from a free-radical generating initiator, an anionic initiator, a cationic initiator or a coordination-type initiator.

The unsaturated polymerizable comonomers can be compounds such as vinyl monomers, for example, acrylonitrile, vinyl chloride, vinyl fluoride, styrene, methyl methacrylate, ethyl acrylate, butyl acrylate, vinyl acetate, methyl vinyl ether, methyl vinyl ketone, sodium styrene sulfonate, methylvinylpyridine, and the like; vinylidene monomers, for example, isobutylene, α-methylstyrene, vinylidene chloride, vinylidene fluoride, vinylidene cyanide, and the like; 1,2-disubstituted ethylenes, for example, fumaric and maleic esters, maleic anhydride, and the like; polymerizable perhalogenated ethylenes, for example, chlorotrifluoroethylene, tetrafluoroethylene, and the like; conjugated diolefins, for example butadiene, isoprene, 2-chlorobutadiene, 2-cyanobutadiene; nonconjugated diolefins, for example, methylidenenorbornene, ethylidenenorbornene, and the like; cyclic olefins, for example, 1-cyanocyclobutene, cyclohexene, norbornene, and the like. A preferred group of ethylenically unsaturated monomers that are especially useful in forming the copolymers of this invention include those having the general formula $CH_2=CR^{11}R^{12}$, wherein $R^{11}$ is selected from the group consisting of hydrogen, R (defined as above), cyano, acyl and acyloxy having 2–12 carbon atoms, alkoxycarbonyl having 2–19 carbon atoms, alkoxy having 1–18 carbon atoms, methylpyridinyl, phenyl sodium sulfonate, chlorine, and fluorine, and $R^{12}$ is defined the same as $R^8$.

The substituents $R^1$ and $R^2$ of the bicyclo[1.1.0]butanes monomers can be halogen, and its alternate form, halo, which includes fluorine, chlorine, bromine, and iodine and when the $R^1$ and $R^2$ are —COOM, the metal, M, includes those of atomic numbers 3, 4, 11–13, 19–32, 37–51, 55–84, 87–103. Preferred metals are those of Groups I–A, I–B, II–A, II–B and VIII of the Periodic Table. Especially preferred metals are the alkali metals. The term "hydrocarbyl free of ethylenic and acetylenic carbon-to-carbon unsaturation" in the bicyco[1.1.0]butane monomers are those hydrocarbyl groups which do not contain aliphatic double or triple bonds. Thus, the hydrocarbyl groups as defined herein include alkyl, cycloalkyl, aralkyl, alkaryl and aryl. Preferred herein are hydrocarbyl groups containing 1–12 carbon atoms, and particularly those containing 1–6 carbon atoms. Illustrative hydrocarbyl groups as defined hereinabove include alkyl groups, such as methyl, ethyl, t-butyl, hexyl, isooctyl, dodecyl, octadecyl, and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl and the like; aryl groups such as phenyl, naphthyl, anthryl, p-phenylphenyl, p-biphenylphenyl, naphthacenyl, benzanthryl, chrysenyl and the like; alkaryl groups such as p-tolyl, p-cumenyl, 2,4,6-tributylphenyl, 9,10-diethyl-1-anthryl, 6-methyl-2-naphthyl, and the like; and aralkyl groups such as benzyl, phenylethyl, diphenylmethyl, α-naphthylethyl, 2-(2-anthryl)-ethyl, 4-(2-anthryl) butyl and the like.

The free-radical-generating initiators may be selected from a wide variety of compounds representative of this type of initiator. Included are the azo initiators, for example, α,α'-azodiisobutyronitrile, 1,1'-azodicyclo hexanecarbonitrile, dimethyl α,α'-azodiisobutyrate and α,α'-azodiisobutyramide, and the organic peroxides and hydroperoxides, for example, dibenzoyl peroxide, di-t-butyl peroxide, and t-butyl hydroperoxide. The initiators can be used in proportions ranging from 0.01 to 10 weight percent of the comonomers being polymerized. Other sources of free radicals for initiating polymerization may also be used such as electron bombardment, ultraviolet light in the presence of a sensitizer, and the like.

Suitable solvents and/or dispersion media for the free-radical copolymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide, and the like. As indicated above, it is not essential that a solvent or dispersion medium be used, and bulk polymerizations can be carried out.

A wide variety of anionic initiators are operable herein for the copolymerization of the bicyclobutanes. Representative anionic initiators that can be used include the alkali metal alkyls, for example, n-butyllithium and methyllithium; the alkali metal alkoxides, for example, potassium t-butoxide and sodium methoxide; and the alkali metal aryls, for example, sodium naphthalene. The concentration of anionic initiator employed can range from 0.01 to 10 weight percent of the monomers being polymerized. The order of addition of the monomer and the initiator is not critical.

Suitable reaction media for the anionic copolymerization include ethers, for example, diethyl ether, tetrahydrofuran, and the dimethyl ether of ethylene glycol; hydrocarbons, for example, benzene and hexane; chlorinated hydrocarbons, for example, chlorobenzene; and amides, for example, dimethylformamide. The ethers are preferred.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride and the like. The concentration of initiator may be from 0.01 to 10 weight percent of the monomers being polymerized.

Coordination-type initiators usually involve a combination of a lower valent transition metal chloride with an organometallic compound. Specific combinations which are useful include diisobutylaluminum chloride with vanadium tris(acetylacetonate), dissobutylaluminum chloride with vanadium oxychloride, triisobutylaluminum with titanium tetrachloride, methylmagnesium bromide with titanium tetrachloride, lithium aluminumtetradecyl with titanium tetrachloride and the like. The concentration of initiator may be from 0.01 to 10 weight percent of the monomers being polymerized.

Preferred reaction media for carrying out copolymerizations initiated by coordination-type catalysts are the hydrocarbons, particularly aliphatic hydrocarbons such as hexane and cyclohexane and the halogenated hydrocarbons such as tetrachloroethylene.

The reaction media for carrying out cationic-initiated copolymerizations are the same as those discussed for coordination-type copolymerizations.

Reaction times can vary from a few seconds (i.e., 5) to several days, for example, two to three days or more depending on the particular comonomers, initiator, solvent, and reaction temperature employed.

Pressures above and below atmospheric pressure are operable. Atmospheric and superatmospheric pressures are preferred.

Because the unsaturated polymerizable comonomer is by definition one that polymerizes by free-radical initiation, the free-radical-initiated polymerization procedure is preferred.

The resulting copolymers contain the repeating structural unit

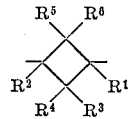

as shown by infrared and proton NMR spectral studies carried out on polymers of the examples. The $R^1$ and $R_2$ groups can be arranged in more than one special configuration, i.e., the $R^1$ and $R^2$ groups can be positioned head to head; head to tail; cis or trans; the polymer may be isotactic, syndiotactic, and the like. All of these configurations are included within the scope of this invention. In general, the copolymers of this invention have a greater stiffness modulus and heat stability than the corresponding homopolymers prepared solely from the unsaturated polymerizable monomer. The increased stiffness modulus is believed due to the presence of the cyclobutane ring in the polymeric chain.

The term "copolymers" as used herein means that the resulting polymer is formed from two or more distinct monomers. The copolymers can be random, block or intermittent copolymers which refers to the relationship of the monomers to each other in the polymer chain.

The bicyclo[1.1.0]butane monomers can be produced by various methods including irradiation of a 1,3-butadiene with ultra-violet light in the presence of promotors and stabilizers. They can also be prepared by the action of metal on a 1,3-dihalocyclobutane. A 3-halobicyclo[1.1.0]butanecarbonitrile such as the 3-chloro derivative can be produced by the action of potassium 5-butoxide on 3,3-dichloro-1-cyanocyclobutane. In the latter process, the 3,3-dihalo-1-cyclocyclobutane can be prepared by reacting a 3-cyanocyclobutanone with $PCl_5$ in benzene at low temperatures.

The copolymers of this invention have a high molecular weight as demonstrated by their high viscosities and high tensile strength. The copolymers have a molecular weight of at least 10,000.

The copolymer end groups are dependent upon the catalysts or polymerization mechanism. When the polymer is formed by a free-radical process, the end groups are those resulting from solvent transfer of the propagating free radical, from reaction of the free radical with impurities, or by disporoportionation of the progagating free radical. For example, the end groups can be

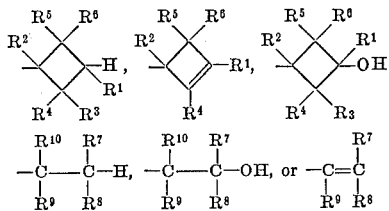

as well as fragments derived from the initiator.

The following examples illustrate the invention in further detail, but are not meant to limit the invention in any respect. Parts are by weight unless otherwise indicated.

Example 1

Into a round-bottom flask equipped with stirrer and condenser was charged 1.1 parts of acrylonitrile, 1.84 parts of 3-methylbicyclo[1.1.0]butanecarbonitrile, 0.0015 part of benzoyl peroxide and 2.8 parts of acetonitrile. The system was evacuated to 20 mm. Hg and then purged with nitrogen. After three such purgings, the mixture was heated at reflux under a nitrogen atmosphere for 7 hours. Filtration gave 0.32 part of a copolymer of acrylonitrile (90.4 mole percent) and 3-methylbicyclo[1.1.0]butanecarbonitrile (9.6 mole percent) which had an $\eta_{inh.}$ of 0.97 at 0.5% concentration in dimethylformamide at 30° C. The M.P. of the polymer on a gradient hot bar was 185° C.

Analysis.—Calcd. for $[(C_3H_3N)_{0.904}(C_6H_7N)_{0.096}]_n$ (percent): N, 24.55. Found (percent): N, 24.48, 24.63.

Example 2

By the procedure of Example 1, when 1.1 parts of acrylonitrile, 3.68 parts of 3-methylbicyclo[1.1.0]butanecarbonitrile, 5.7 parts of acetonitrile and 0.0025 part of benzoyl peroxide were reacted at reflux for 24 hours, there was obtained 0.25 part of a copolymer of acrylonitrile (76 mole percent) and 3-methylbicyclo[1.1.0]butanecarbonitrile (24 mole percent) which had an $\eta_{inh.}$ of 0.72 at 0.5% concentration in dimethylformamide at 30° C. The M.P. of the polymer on a gradient hot bar was 175° C.

Analysis.—Calc'd for $[(C_3H_3N)_{0.76}(C_6H_7N)_{0.24}]_n$ (percent): N, 22.33. Found (percent): N, 22.23, 22.44.

Example 3

By the procedure of Example 1, when 1.1 parts of acrylonitrile, 5.52 parts of 3-methylbicyclo[1.1.0]butanecarbonitrile, 0.035 part of benzoyl peroxide and 6.5 parts of acetonitrile were reacted at reflux for 24 hours, there was obtained 0.25 part of a copolymer of acrylonitrile (68 mole percent) and 3-methylbicyclo[1.1.0]butanecarbonitrile (32 mole percent) which had an $\eta_{inh.}$ of 0.45 at 0.5% concentration in dimethylformamide at 30° C. The M.P. of the polymer on a gradient hot bar was 165° C.

Analysis.—Calc'd for $[(C_3H_3N)_{0.68}(C_6H_7N)_{0.32}]_n$ (percent): N, 21.27. Found (percent): N, 21.38, 21.15.

Example 4

A four-neck flask equipped with a mechanical stirrer, nitrogen inlet and outlet, and septum for catalyst introduction was flamed under a stream of dry nitrogen and then charged with 56.4 parts of dimethylformamide, 4.6 parts of 3-methylbicyclo[1.1.0]butanecarbonitrile and 4.1 parts of acrylonitrile. The solution was stirred and cooled to −50° C. and then 1.9 parts of a saturated solution of sodium cyanide in dimethylformamide was added. After 1.2 hours at −50° C., 4.7 parts of a 3% sulfuric acid solution in dimethylformamide was added. The solution was allowed to warm to room temperature and the polymer was precipitated by pouring the solution, with stirring, into 474 parts of methanol. Filtration and drying gave 3.91 parts of a copolymer of 3-methylbicyclo[1.1.0]butanecarbonitrile (4 mole percent) and acrylonitrile (96 mole percent) which had an $\eta_{inh.}$ of 0.88 at 0.5% concentration in dimethylformamide at 30° C. The M.P. of the polymer on a gradient hot bar was 190° C.

Analysis.—Calc'd for $[(C_3H_3N)_{0.96}(C_6H_7N)_{0.04}]_n$ (percent): N, 25.53. Found (percent): N, 25.75, 25.30.

Example 5

A glass tube was charged with 4.5 parts of styrene, 4.6 parts of 3-methylbicyclo[1.1.0]butanecarbonitrile and 0.005 part of $\alpha,\alpha'$-azodiisobutyronitrile. The system was evacuated and purged with nitrogen three times, then heated under nitrogen at 65–70° C. for 72 hours. The viscous solution was poured into 79 parts of methanol with stirring. The precipitated copolymer of styrene (93.8 mole percent) and 3-methylbicyclo[1.1.0]butanecarbonitrile (6.2 mole percent) had an $\eta_{inh.}$ of 0.36 at 0.1% concentration in dimethylformamide at 25° C. A clear film prepared from this polymer by compression molding at 110–115° C. was self-supporting and tough, indicating its high molecular weight. The polymer had a M.P. of 150° C.

Analysis.—Calc'd for $[(C_8H_8)_{0.938}(C_6H_7N)_{0.062}]_n$ (percent): N, 0.85. Found (percent): N, 0.85.

Example 6

A reactor, consisting of a round-bottom, side-neck flask (fitted with a rubber septum) containing a magnetic stirrer bar and equipped with a condenser with connections thereto to permit evacuation and purging with dry nitrogen, was dried by baking overnight at 150° C. The reactor was then cooled to −78° C. under a dry nitrogen atmosphere and a solution of 1.84 parts of 3-methylbicyclo[1.1.0]butanecarbonitrile in 35.6 parts of tetrahydrofuran at 0° C. and 0.12 part of a 15%-by-weight solution of n-butyllithium in hexane were introduced. After stirring at 0° C. for 30 minutes, 1.6 parts of anhydrous acrylonitrile was added. The mixture was stirred at 0° C. for 3 hours and finally at room temperature for 16 hours. The reaction mixture was washed into methanol, and the resulting slurry was stirred for about 3 minutes in a high-speed blender and then filtered. The product was again stirred in methanol and finally stirred once in distilled water in the blender and then dried in a vacuum desiccator at room temperature with continued pumping. This procedure gave 2.1 parts of a copolymer of 3-methylbicyclo[1.1.0]butanecarbonitrile (88 mole percent) and acrylonitrile (12 mole percent) which had an $\eta_{inh.}$ of 0.62 at 0.1% concentration in trifluoroacetic acid at 25° C.

Analysis.—Calc'd for $(C_6H_7N)_{0.38}(C_3H_3N)_{0.12}$ (percent): N, 15.87. Found (percent): N, 15.91, 15.86.

Example 7

A glass tube was charged with 2.33 parts of 3-methylbicyclo[1.1.0]butanecarbonitrile, 1.6 parts of vinyl acetate, and 0.011 part of 1,1'-azodicyclohexanecarbonitrile. The tube was cooled, evacuated to degas, sealed under vacuum and heated at 100° C. for 22 hours. The tube was opened and the residual monomers were evaporated to leave 0.26 part of a copolymer of 3-methylbicyclo-[1.1.0]butanecarbonitrile (11 mole percent) and vinyl acetate (89 mole percent) which had an $\eta_{inh.}$ of 0.1 at 0.5% concentration in acetone at 30° C.

*Analysis.*—Calcd. for $[(C_6H_7N)_{0.11}(C_4H_6O_2)_{0.89}]_n$ percent): N, 1.67. Found (percent): N, 1.87, 1.44.

Example 8

*Part A.*—To a stirred solution of 4.50 g. (0.0401 mole) of potassium t-butoxide in 30 ml. of purified tetrahydrofuran was added at 3° during 24 minutes a solution of 3.90 g. (0.0338 mole) of 3-chlorocyclobutanecarbonitrile in 5 ml. of tetrahydrofuran. A nitrogen atmosphere was maintained during the addition. The thick, white slurry was stirred at 0° for an additional 83 minutes, at which time 75 ml. of a saturated aqueous solution of potassium chloride was added. The tetrahydrofuran layer was separated and washed twice with 25-ml. portions of potassium chloride solution. The aqueous layers were backwashed with 25 ml. of tetrahydrofuran. The organic layers were dried with magnesium sulfate and distilled in a small Vigreux column. A little 2,5-di-t-butylquinone was added to suppress possible radical polymerization. 1-cyanobicyclo[1.1.0]butane, 1.73 g. (65%), was obtained as a colorless liquid, B.P. 58° (26 mm.). The N.M.R. spectrum confirmed the assigned structure.

*Part B.*—Polymerization of a stirred mixture of 50.4 g. of acrylonitrile, 375 ml. of water, 4.0 g. of 1-cyanobicyclobutane, 75 g. of sodium sulfate, and 0.20 g. of an anionic dispersing agent was initiated by addition of 0.5 g. of potassium persulfate and 0.5 g. of sodium bisulfate, each dissolved in a minimum amount of water. After 24 hours' vigorous stirring, some solid and some emulsion were present. The mixture was left an additional 40 hours without stirring and a soft white mass resulted. The polymer was separated by filtration, washed separately in water and methanol and then dried to obtain 27.3 g. of a white copolymer of 1-cyanobicyclo[1.1.0]butane and acrylonitrile, having an inherent viscosity of 4.14 at 100° C. in N-methylpyrrolidone containing 5% LiCl at 0.5% concentration.

A film was cast from a 7% solution of the copolymer of Example 8 in N-methylpyrrolidone containing 5% LiCl. The film was extracted with water and dried. A cut strip of film was drawn 18× over a roll at 250° C. The size was 51 denier. The properties of this strip were compared with those of similarly drawn polyacrylonitrile.

|  | At 25°C., 65% relative humidity | | At 90°C. in water | |
| --- | --- | --- | --- | --- |
|  | Copolymer | Polyacrylonitrile | Copolymer | Polyacrylonitrile |
| Tenacity (g./d.) | 5.5 | 2.40 | 3.45 | 0.62 |
| Elongation at break (percent) | 12.5 | 23.7 | 12.1 | 158.0 |
| Stiffness modulus (g./d.) | 72.0 | 50.0 | 14.3 | 1.0 |

Example 9

A mixture of 99.0 g. of styrene, 4.0 g. of 1-cyanobicyclo[1.1.0]butane and 1.0 g. of azobisisobutyronitrile in 1 l. of toluene was heated at 80° C. for 24 hours. The resulting mixture was poured into excess methanol. The fine white polymer was separated by filtration, washed twice with methanol and dried to obtain 33.3 g. of white solid copolymer of 1-cyanobicyclobutane and styrene. Inherent viscosity in chloroform was 0.06. Elemental analysis for nitrogen showed that 3.8 wt. percent of 1-cyanobicyclobutane was incorporated in the copolymer.

Example 10

A mixture of 95.0 g. of methyl methacrylate, 4.0 g. of 1-cyanobicyclo[1.1.0]butane, 8.6 g. of a 3% aqueous solution of polymethacrylic acid, 4.3 g. of dipotassium phosphate and 400 ml. of deoxygenated water was stirred vigorously and heated at 80° C. while at 10-minute intervals 6 ml. portions of a solution of 1.5 g. of azobisisobutyronitrile in 50 ml. of methanol were added for a total of six additions. Granules of solid copolymer were formed. After an additional 1.5 hours of stirring at 80° C., the mixture was cooled. The granular solid was collected by filtration, washed with water and methanol and dried to obtain 80.6 g. of copolymer of 1-cyanobicyclo[1.1.0]butane and methyl methacrylate in the form of beads. From a chloroform solution of the copolymer a clear, stiff film was obtained by casting. Elemental analysis for nitrogen showed that 4.2 wt. percent of 1-cyanobicyclo[1.1.0]butane was incorporated in the copolymer.

Example 11

*Part A.*—A solution of 93 parts of 1-cyano-3-methylenecyclobutane in 4000 parts of methylene chloride was heated at reflux and a solution of 93 parts of $N_2O_4$ in 1300 parts of methylene chloride slowly added. Excess $N_2O_4$ was removed by distillation and 18 parts of water was added in small portions. The resulting solution was dried over silica gel and distilled at reduced pressure to obtain the mixed isomers of 1-cyano-3-hydroxy-3-nitromethylcyclobutane in the form of a viscous oil.

*Part B.*—The viscous isomer mixture obtained in Part A was heated at reflux overnight in constant boiling aqueous hydrochloric acid. Excess water was removed by distillation at reduced pressure and the residue extracted with diethyl ether. The ether extract was freed of solvent by distillation. The residue was heated at reflux in a molar excess of methanol in the presence of a trace of sulfuric acid as catalyst. Excess alcohol was then removed by distillation and the residue extracted with diethyl ether. The ether extract was washed with aqueous sodium bicarbonate, dried over silica gel and distilled to obtain the mixed cis and trans isomers of 1,3-bis(methoxycarbonyl)-3-hydroxycyclobutane.

*Part C.*—A mixture of 90 parts of 1,3-bis(methoxycarbonyl)-3-hydroxycyclobutane and 40 parts of pyridine was cooled at 0° C. and 60.7 parts of thionyl chloride ($SOCl_2$) was added in small portions. The resulting mass was heated for 1.5 hours at 60° C. and then at 80–100° C. for 0.5 hour. The residue was extracted three times with diethyl ether. The combined extracts were washed with water, dried over silica gel and distilled to obtain 1,3-bis-(methoxycarbonyl)-3-chlorocyclobutane boiling at 72° C. at 1 mm. pressure.

*Part D.*—A solution of 206 parts of 1,3-bis(methoxycarbonyl)-3-chlorocyclobutane in 300 parts of tetrahydrofuran was added slowly to a mixture of about 30 parts of sodium hydride in 444 parts of tetrahydrofuran, the reaction temperature being held between 25° and 50° C. About 50 parts of aqueous sodium chloride was added to decompose excess sodium hydride, followed by 150 parts of water. The residue was extracted with 500 parts of diethyl ether. The ether extract was washed with water, dried over silica gel and the ether removed by distillation. The residue was recrystallized from 150 parts of petroleum ether. The crude crystalline product was purified by sublimation to obtain 1,3 - bis(methoxycarbonyl)bicyclo[1.1.0]butane in the form of colorless crystals melting at 59.5–61.5° C.

*Part E.*—A solution of 9.8 g. of 1,3-bis(methoxycarbonyl)-bicyclo[1.1.0]butane, 29.4 ml. of methyl methacrylate, and 0.08 g. of azobisisobutyronitrile was used to fill a glass cell 4″ x 4″ x 1/8″. The assembly was allowed to stand at room temperature for 50 hours. It was then heated at 60° C. for 13 hours, then at 100° C. for 4 hours, and then at 78° C. for 16 hours. The resulting copolymer was removed from the cell and found to be a clear, tough, transparent sheet. The inherent viscosity was 2.081 at 0.5% concentration in chloroform at 20° C. It had a glass transition temperature of 81° C.

Example 12

The procedure of Example 11 was repeated using a solution of 9.6 ml. of 1-cyanobicyclo[1.1.0]butane, 28.8 ml. of methyl methacrylate, and 0.08 g. of azobisisobutyronitrile. After the heating cycle, the assembly was brought to room temperature. The copolymer was removed from the cell and found to be a clear, tough sheet. It showed a glass transition temperature of 94° C.

Example 13

A solution of 12.4 ml. of 1-methoxycarbonylbicyclo[1.1.0]butane, 37.2 ml. of methyl methacrylate, and 0.099 g. of azobisisobutyronitrile was placed in a glass cell of the type described in Example 11 and heated at 60° C. until the composition had solidified. The product was a clear, tough, high-molecular-weight sheet of copolymer which had an inherent viscosity of 2.47 at 0.5% concentration in chloroform at 20° C.

Example 14

(A) About 91 parts of acrylonitrile and 9 parts of 1-cyanobicyclo[1.1.0]butane were placed in sufficient oxygen-free water to make the total monomer weight about 14% of the total weight. The water was maintained at about 50° C. throughout and the pH of the water was maintained at 3.0 by the presence of sulfuric acid. 0.3 p.p.m. (based on total water) of $Fe^{++}$ ions were present in the form of ferrous ammonium sulfate hexahydrate. Polymerization was initiated by the addition of 0.25% (based on the weight of the monomers) of potassium persulfate and 1.25% (based on the weight of the monomers) of sodium metabisulfite. After 30 minutes, polymerization was stopped by bringing the pH to 7 with sodium carbonate. The copolymer was isolated by filtration, washed with water and acetone, and dried. Conversion was 78.8% and the inherent viscosity (in dimethylformamide—0.5% solution at 25° C.) was 1.81.

(B) The procedure of part A was repeated except that 87 parts of acrylonitrile and 13 parts of 1-cyanobicyclo[1.1.0]butane were employed. Conversion was 81.7% and the inherent viscosity in dimethylformamide was 2.17. Analysis showed the acrylonitrile-bicyclobutane unit ratio was about 79 to 21.

(C) The procedure of part A was repeated except that 57.5 parts of acrylonitrile, 42.5 parts of 1-cyanobicyclo[1.1.0]butane, and 1% (based on the weight of the monomers) of sodium persulfate were employed. Conversion was 86.2%; the inherent viscosity in dimethyl formamide was 2.12; and the ratio of monomer units in the polymer was about 50/50.

(D) Fibers of the above copolymers were prepared by dry spinning dimethy formamide or dimethyl formamide/lithium chloride solutions (18–20% solids) of the copolymers. The copolymer prepared in part A had a Brookfield viscosity of 1250 poise at 25° C. in dimethyl formamide (20% solids). The copolymer prepared in part B had a Brookfield viscosity of 1310 at 25° C. in dimethyl formamide/2% lithium chloride (20% solids); and the copolymer prepared in part C has a Brookfield viscosity of 225 poise at 95° C. in dimethyl formamide/1% lithium chloride (18% solids). Fibers of each of the copolymers were prepared by dry spinning from the respective foregoing solutions. The as-spun fibers were extracted, drawn in boiling water, relaxed at 140° C. for five minutes, and boiled off. Other fiber samples were extracted in warm water and drawn over a hot pin before being boiled off. Physical properties of the fibers of the copolymers of parts A, B and C are shown in the following table:

| Polymer | Properties of fibers drawn in boiling water | | | Properties of fibers drawn on a hot pin | | |
|---|---|---|---|---|---|---|
| | A | B | C | A | B | C |
| Draw (times) | 4 | 4 | 3 | [1] 6X | [2] 8X | [3] 8X |
| Denier (den.) | 3.2 | 3.7 | 2.4 | 3.75 | 1.1 | 1.0 |
| Dry: | | | | | | |
|   Tensile strength (g./den.) | 3.4 | 2.7 | -------- | 5.4 | 5.4 | |
|   Elongation (percent) | 23.2 | 24.0 | -------- | 15.2 | 14.2 | |
|   Initial modulus (g./den.) | 56.6 | 51.0 | -------- | 94.9 | 66.4 | |
| Wet (90° C.): | | | | | | |
|   Tensile strength (g./den.) | 0.9 | 0.7 | 0.8 | 1.3 | 2.2 | 3.1 |
|   Elongation (percent) | 64 | 61 | 33 | 49 | 18.6 | 16 |
|   Initial modulus (g./den.) | 5.4 | 4.9 | 10.1 | 5.9 | 5.4 | 15.7 |

[1] 200° C.
[2] 190° C.
[3] 240° C.

Example 15

An approximately 89.7/10/0.3 (by weight) copolymer of acrylonitrile, 1-cyanobicyclo[1.1.0]butane and sodium styrene sulfonate was prepared at 50° C. under nitrogen using 80 parts of water, 7.35 parts of acrylonitrile, 0.65 part of 1-cyanobicyclobutane and 0.19 part of sodium styrene sulfonate. The pH was adjusted to 3.2 by addition of sulfuric acid. Sufficient ferrous ammonium sulfate hexahydrate was added to make the $Fe^{++}$ concentration 0.3 p.p.m. $Fe^{++}$ based on total water. Five parts of potassium persulfate solution (0.25% persulfate based on the total weight of monomer) and 10 parts of sodium metabisulfite solution (1.25% based on the total weight of monomers) were added to start polymerization, which was allowed to proceed for ten minutes before being stopped by addition of dilute sodium carbonate to pH 7. The copolymer was filtered off, washed and dried. The yield was 71% and the inherent viscosity in dimethylformamide was 2.14.

In a similar manner, two acrylonitrile/1-cyanobicyclo[1.1.0]butane copolymers in ratios by weight of 90/10 and 50/50, and one copolymer of acrylonitrile/1-cyanobicyclo[1.1.0]butane/sodium styrene sulfonate (50/50/0.3) were prepared.

Separate samples of the above polymers (0.5 part) were placed in beakers containing 150 parts of boiling water and 0.025 part of "Sevron" Blue 5G (5% dye based on polymer). After boiling for thirty minutes, the polymers were filtered off, washed with water, and air dried. Visual examination showed that the acrylonitrile/1-cyanobicyclo[1.1.0]butane copolymers dyed fairly well, but that the deepest shade of blue was shown by the two copolymers containing approximately 0.3% sodium styrene sulfonate.

Example 16

A copolymer of acrylonitrile/1-cyanobicyclo[1.1.0]butane/2-methyl-5-vinylpyridine (47.5/47.5/5) was prepared from 12.3 parts of acrylonitrile, 8.4 parts of 1-cyanobicyclobutane, and 1.0 part of 2-methyl-5-vinylpyridine in 100 parts water. The pH was adjusted to 3 with dilute sulfuric acid and 14.3 parts of a 0.5% solution of hydrogen peroxide and 24 parts of a 1.2% solution of 1-thioglycerol were added. After addition of a few crystals of ferrous ammonium sulfate hexahydrate, the polymerization was continued for thirty minutes at 50° C. before five parts of a 1% Versene® (a metal sequestering agent) solution were added. Polymer was removed by filtration, washed and dried. An acrylonitrile/1-cyanobicyclo-[1.1.0]butane (50/50) copolymer was prepared in the same way. Samples (0.5 gram) of the two polymers were added to individual beakers containing 150 parts of boiling water and 0.50 part of a blue dye, Anthraquinone Blue SWF®. After thirty minutes, the polymers were filtered off, washed with water and dried. Both were dyed;

however, only the ternary copolymer was dyed a deep blue.

Example 17

A copolymer was prepared using an 87/13 mixture of acrylonitrile/1 - methoxycarbonylbicyclo[1.1.0]butane and a monomer/water ratio of 1/7. The pH was adjusted to 3 by adding dilute sulfuric acid. There were then added 0.3 p.p.m. of ferrous ion (based on total water) in the form of ferrous ammonium sulfate hexahydrate, 0.50% potassium persulfate (based on monomer), and 1.25% sodium metabisulfite (based on monomer). Polymerization was continued for 30 minutes and then stopped by adjusting the pH to 7 by addition of sodium carbonate. The acrylonitrile/1 - methoxycarbonylbicyclo[1.1.0]butane copolymer was obtained at 82.5% conversion and had an inherent viscosity of 1.64 in dimethylformamide. The white copolymer was dissolved in dimethylformamide and cast into films. Strips cut from these films and drawn 4× had 90° C. wet properties of $T/E/M_i=0.2/179/0.65$. ($T/E/M_i$ represents tensile strength/elongation/initial modulus.)

Example 18

A copolymer was prepared using an 87/13 mixture of acrylonitrile/1,3-bis(methoxycarbonyl) bicyclo[1.1.0]butane. The procedure used was the same as in Example 17. The acrylonitrile/1,3-bis(methoxycarbonyl)bicyclo[1.1.0]butane copolymer was obtained in 77.5% conversion and had an inherent viscosity of 2.02 in dimethylformamide. A film was cast from a dimethylformamide solution of the copolymer. Strips of the film drawn 4× showed 90° C. wet properties of $T/E/M_i=0.17/57.8/0.59$.

Example 19

A 3.5:1 mixture of 1-cyanocyclobutene and 1-cyanobicyclobutane by parts was heated with a trace of azobisisobutyronitrile. A chloroform-insoluble, high-softening thermo-plastic, heat-stable copolymer was formed.

1-cyanocyclobutene is prepared from cyclobutene 1-carbonyl chloride by reacting it with ammonia in ether at −80° C. to obtain cyclobutene-1-carboxamide which is converted to 1-cyanocyclobutene with $P_2O_5$ at 150° C. by distillation. 1-cyanocyclo[1.1.0]butane is prepared by photolyzing a saturated $Cu_2Cl_2$ ether solution of 2-cyano-1,3-butadiene with ultraviolet light (using low pressure mercury lamps as the ultraviolet light source).

Example 20

*Part A.*—In a glass reactor was placed 87.2 g. of phosphorous pentachloride and 100 ml. of carbon tetrachloride. The mixture was stirred at −10° to 0° C. To the mixture was added over 1 hour a solution of 38 g. of 3-cyanocyclobutanone in 50 ml. of carbon tetrachloride and 200 ml. of benzene. The mixture was stirred another 3 hours at −10° to 0° C., then was poured into 500 g. of ice water. The aqueous mixture was extracted (5×100 ml.) with chloroform, the chloroform extracts were backwashed (3×100 ml.) with water, then dried, filtered, and evaporated. The residue was distilled twice at reduced pressure to give 17.9 g. of 3,3-dichlorocyclobutanecarbonitrile as a colorless liquid, B.P. 38–40° C. (0.1 mm.).

*Part B.*—In a nitrogen-swept glass reactor was placed 15 g. of 3,3-dichlorocyclobutanecarbonitrile and 400 ml. of ether. The solution was stirred at −10° C. To the stirred solution was added 16.5 g. of potassium tert.-butoxide over 15 minutes. The reaction mixture was stirred at −10° C. for 2 hours. Then 100 mg. of 2,5-di-t-butyl-p-quinone, 10 g. of Dry Ice, 2 ml. of water, and 10 g. of magnesium sulfate were added. The mixture was filtered through diatomaceous earth (rinsing several times with ether), and the ether filtrate was evaporated to give ca. 9 g. of yellow liquid. Distillation gave only one fraction, B.P. 36.5–37° C. (1.9 mm.), 6.3 g. of 3-chlorobicyclobutanecarbonitrile in the form of a colorless liquid which crystallized at Dry Ice temperature.

*Part C.*—A copolymer was prepared in the manner of Example 17. In a nitrogen-swept glass reactor was placed 1.70 g. of distilled acrylonitrile, 0.35 g. of 3-chlorobicyclo[1.1.0]butanecarbonitrile, 7 ml. of oxygen-free distilled water, and 0.50 ml. of a solution prepared from 64 ml. of 0.1 N $H_2SO_4$ plus 0.016 g. of ferrous ammonium sulfate hexahydrate in 128 ml. of oxygen-free water. This gave a reaction medium of pH about 3 and ferrous ion level of 0.3 p.p.m. based on total water. Catalyst was added (0.5% based on monomers) as 1.25 ml. of potassium persulfate solution (1.0 g. persulfate in 125 ml. of oxygen-free water) followed by activator (1.25% based on monomers) as 1.20 ml. of sodium metabisulfite solution (2.0 g. of metabisulfite in 100 ml. of oxygen-free water). The reactor was closed and agitated at 50° C. Polymerization started at once and agitation at 50° C. was continued for 30 minutes. The thick white product was filtered, washed well with water and methanol and air-dried overnight to obtain 1.56 g. of copolymer in the form of a white powder. In 0.5% solution in dimethylformamide at 25° C. it had an inherent viscosity of 3.04. The copolymer contained 3.98% Cl, representing 12.7% by weight of units from 3-chlorobicyclo[1.1.0]butanecarbonitrile.

*Part D.*—A solution of 0.71 g. of the acrylonitrile/3-chlorobicyclo[1.1.0]butanecarbonitrile copolymer of Part C in 6 ml. of dimethylformamide was cast as a film at 100° C., dried three hours at 75° C. and cut into ¼″ strips for testing. Strips drawn to four times and eight times their original lengths at 145° C. and 175° C., respectively, had much higher 90° C. wet moduli than corresponding strips of control films of polyacrylonitrile.

Example 21

*Part A.*—In a glass reactor a mixture of 347 g. of 3-chlorocyclobutanecarbonitrile, 2 liters of dimethylsulfoxide and 294 g. of sodium cyanide was stirred at 100° C. for 6 hours. About 1.5 liters of dimethylsulfoxide was then removed by distillation at reduced pressure. The residue was added to 2 liters of water and extracted with chloroform (6× 300 ml.). The combined chloroform layers were backwashed with water (3× 500 ml.). The chloroform layer was dried, filtered and evaporated. The residue was distilled to obtain 247 g. of 1,3-cyclobutanedicarbonitrile in the form of a colorless liquid, boiling at 94–103° C. (0.4 mm.).

*Part B.*—In a glass reactor a mixture of 35 g. of 1,3-cyclobutanedicarbonitrile and 70 g. of phosphorus pentachloride was stirred at 100° C. for 6 hours and allowed to stand at room temperature overnight. Material boiling at 74° C. was removed by distillation. The residue was distilled under vacuum to obtain 16.5 g. of a mixture of colorless liquid and white solid boiling at 107–114° C. (2.0 mm.). A 10 g. portion of this distillate was dissolved in a minimum amount of benzene and subjected to elution chromatography with benzene on a column of 450 g. of a magnesia silica gel. Fractions 133-ad infinitum were combined and evaporated to yield 3.3 g. of monochloride which was distilled to obtain 2.75 g. of a mixture of cis and trans 1-chloro-1,3-cyclobutanedicarbonitrile in the form of a glassy colorless solid boiling at 75–80° C. (0.2 mm.).

*Part C.*—In a glass reactor under nitrogen was placed 2.6 g. of 1-chloro-1,3-cyclobutanedicarbonitrile and 100 ml. of ether. The solution was stirred at −10° C. and 2.5 g. of potassium t-butoxide was added in 10 portions over a period of 15 minutes. The reaction mixture was stirred an additional hour at −10° C. To the mixture was then added 1.5 g. of solid carbon dioxide, 0.4 ml. of water, 2 g. of magnesium sulfate, and 0.200 g. of 2,5-di-t-butyl-p-quinone. The mixture was filtered through diatomaceous earth and rinsed through with ether. The combined filtrate was evaporated to yield a white solid which was dissolved in chloroform and distilled to yield 0.95 g. of a light yellow solid boiling at 69° C. (0.25 mm.). It was recrystallized from benzene-petroleum ether to obtain 1,3-dicyanobicyclo[1.1.0]butane in the form of colorless crystals melting at 51.5–52.5° C.

*Part D.*—The procedure of Part C of Example 20 was repeated using an 85:15 (by weight) mixture of acrylonitrile and 1,3-dicyanobicycle[1.1.0]butane as the mixture to be polymerized and agitation of the polymerizing mixture at 50° C. was continued at 1 hour. The acrylonitrile/1,3-dicyanobicycle[1.1.0]butane copolymer was obtained in 91% yield and had an inherent viscosity in dimethylformamide of 2.61. Strips of film of the copolymer drawn 4× at 125° C. had 90° C. wet T/E/M$_i$ values of 0.4/68.6/5.0.

Example 22

A glass tube was charged with 19.60 g. of methyl methacrylate, 0.40 g. of 1-cyanobicyclo[1.1.0]butane, 0.02 g. of azobisisobutyronitrile, and 0.028 g. of lauryl mercaptan. The tube was cooled, evacuated to degas, sealed under vacuum and heated at 60° C. for 17 hours. The tube was then heated for 2 hours at 125° C. The tube was opened, and the clear copolymer was dissolved in chloroform and precipitated from methanol. The copolymer was then washed well with water and dried. The yield of copolymer was 18.0 g. The copolymer had an $\eta_{inh}$ of 0.957 at 0.5% concentration in chloroform at 20° C. Differential thermal analysis of the copolymer exhibited a glass transition temperature of 119.0° C. for the copolymer. When the polymer was held at 300° C. for 30 minutes in an atmosphere of nitrogen, the loss in weight was 1.43%.

*Analysis.*—Calcd. for 2% 1-cyanobicyclo[1.1.0]butane in the copolymer (percent): N, 0.355. Found (percent): N, 0.37, 0.36.

Example 23

A glass tube was charged with 19.80 g. of methyl methacrylate, 0.20 g. of 1-cyanobicyclo[1.1.0]butane, 0.02 g. of azobisisobutyronitrile, and 0.028 g. of lauryl mercaptan. The tube was cooled, evacuated to degas, sealed under vacuum and heated at 60° C. for 17 hours. The tube was then heated for 2 hours at 125° C. The tube was opened and the clear copolymer was dissolved in chloroform and precipitated from methanol. The copolymer was washed well with water and finally dried. The yield of copolymer was 18.0 g. The copolymer had an $\eta_{inh}$ of 0.935 at 0.5% concentration in chloroform at 20° C. Differential thermal analysis of the copolymer exhibited a glass transition temperature of 119.0° C. for the copolymer. When the polymer was held at 300° C. for 30 minutes in an atmosphere of nitrogen, the weight loss was 2.17%.

Example 24

A mixture of 122.5 g. of methyl methacrylate, 2.5 g. of 1-cyanobicyclo[1.1.0]butane, 0.39 g. of lauryl mercaptan, 0.050 g. of an ultraviolet light stabilizer, 10.7 g. of a 3% aqueous solutio nof polymethacrylic acid, 8.7 g. of disodium phosphate, and 500 ml. of water was stirred vigorously, in an inert atmosphere, and heated to 81° C. while at 10 minute intervals 0.75 ml. portions of a solution of 1.5 g. of azobisisobutyronitrile in 50 ml. of methanol were added for a total of 5 additions after an initial addition of 8.5 ml. After all additions were complete a 12 ml. portion was added, at which time an exothermic reaction took place and granules of the solid copolymer were formed. The reaction was heated to reflux and held at this temperature for 45 minutes. The reaction was cooled to 70° C., filtered, washed with water and dried to obtain 89.0 g. of copolymer of 1-cyanobicyclo[1.1.0]butane and methyl methacrylate in the form of beads. The copolymer had an $\eta_{inh}$ of 0.454 at a 0.5% concentration in chloroform at 20° C. Differential thermal analysis of the copolymer exhibited a glass transition temperature of 112.0° C. When the polymer was held at 300° C. for 30 minutes, in an atmosphere of nitrogen, the loss in weight was 2.90%. A cast film of the copolymer exhibited a peak at 2240 cm.$^{-1}$ in the infrared (C≡N).

*Analysis.*—Calcd. for 2% 1-cyanobicyclo[1.1.0]butane in the copolymer (percent): N, 0.355. Found (percent): N, 0.41.

Example 25

A mixture of 123.75 g. of methyl methacrylate, 1.25 g. of 1-cyanobicyclo[1.1.0]butane, 0.39 g. of lauryl mercaptan, 0.050 g. of an ultraviolet light stabilizer, 10.7 g. of a 3% aqueous solution of polymethacrylic acid, 8.7 g. of disodium phosphate, and 500 ml. of water was stirred vigorously, in an inert atmosphere, and heated to 81° C. while at 10 minute intervals, 0.75 ml. portions of a solution of 1.5 g. of azobisisobutyronitrile in 50 ml. of methanol were added for a total of 5 additions after an initial addition of 8.5 ml. After all additions were complete a 12 ml. portion was added, at which time an exothermic reaction took place and granules of the solid copolymer were formed. The reaction was heated to reflux and held at this temperature for 45 minutes. The reaction was cooled to 70° C., filtered, washed with water and dried to obtain 92.0 g. of copolymer of 1-cyanobicyclo[1.1.0]butane and methyl methacrylate in the form of beads. The copolymer had an $\eta_{inh}$ of 0.420 at a 0.5% concentration in chloroform at 20° C. Differential thermal analysis of the copolymer exhibited a glass transition temperature of 109.2° C. When the polymer was held at 300° C. for 30 minutes, in an atmosphere of nitrogen, the loss in weight was 4.45%. A cast film of the copolymer exhibited a peak at 2240 cm.$^{-1}$ (C≡N) in the infrared.

The properties of the copolymers of Examples 22–25 are summarized in Table I below.

When a corresponding amount of 1-methoxycarbonylbicyclo[1.1.0]butane adjusted for molecular weight is substituted for the amount of 1-cyanobicyclo[1.1.0]butane in Examples 22–25, the corresponding 1.0 and 2.0 wt. percent 1 - methoxycarbonylbicyclo[1.1.0]butane/methyl methacrylate copolymers are produced. These copolymers have good thermal stabilities and higher glass transition temperatures compared to poly(methyl methacrylate). Additionally, these polymers remain colorless when heated for 30 minutes at 300° C.

TABLE I.—PROPERTIES OF METHYL METHACRYLATE/ 1-CYANOBICYCLO[1.1.0]BUTANE COPOLYMERS

| Example | Wt. percent 1-cyanobicyclo[1.1.0]-butane | $\eta_{inh}$ | Tg, ° C. | Percent wt. loss (300° C.) for 30 minutes |
|---|---|---|---|---|
| 22 | 2.0 | 0.957 | 119.0 | 1.43 |
| 23 | 1.0 | 0.935 | 119.0 | 2.17 |
| 24 | 2.0 | 0.454 | 112.0 | 2.90 |
| 25 | 1.0 | 0.420 | 109.2 | 4.45 |

When the bicyclo[1.1.0]butanes shown in Table II below are substituted for 1-cyanobicyclo[1.1.0]butane in the procedure of Part B of Example 8 (omitting only the 75 g. of sodium sulfate), the corresponding acrylonitrile copolymers are obtained:

TABLE II bicyclo[1.1.0]butane
1-hydroxymethylbicyclo[1.1.0]butane
1,3-bis(trifluoromethyl)-2,2,4,4-tetrafluorobicyclo[1.1.0]butane
2,4-bis(methoxycarbonyl)bicyclo[1.1.0]butane
2,4-bis(ethoxycarbonyl)-1-methyl-3-phenylbicyclo[1.1.0]butane
1,3-dimethylbicyclo[1.1.0]butane
1-methoxycarbonylbicyclo[1.1.0]butane
1-ethoxycarbonylbicyclo[1.1.0]butane
1-carboxybicyclo[1.1.0]butane
2-carboxy-1,3-diphenylbicyclo[1.1.0]butane
1-propionyloxy-2,2,4,4-tetramethylbicyclo[1.1.0]butane
1-carbamoyl-3-methylbicyclo[1.1.0]butane 2-n-butyl-1-cyano-3-(9-heptadecyl)-2-methylbicyclo[1.1.0]butane
1-cyano-4-cyclohexyl-2-cyclopropyl-2,3-dimethylbicyclo-[1.1.0]butane
2-benzyl-1-cyano-2-methyl-3-tetradecylbicyclo[1.1.0]butane
1-cyano-3-methyl-2-(β-naphthyl)bicyclo[1.1.0]butane
1-cyano-2-(α-naphthyl)-2-phenyl-3-(1-phenyl-1-p-tolyl)-methylbicyclo[1.1.0]butane
1-cyano-3-(β-cyclohexylethyl)bicyclo[1.1.0]butane
1-cyano-2-cyclohexylmethyl-3-methylbicyclo[1.1.0]butane
1-phenylbicyclo[1.1.0]butane
1-p-hydroxyphenylbicyclo[1.1.0]butane
1-p-chlorophenylbicyclo[1.1.0]butane
1-ethylthiocarbonylbicyclo[1.1.0]butane
1-chlorobicyclo[1.1.0]butane
3-chloro-1-methoxycarbonylbicyclo[1.1.0]butane
1-methoxybicyclo[1.1.0]butane
1-acetoxybicyclo[1.1.0]butane
1-nitrobicyclo[1.1.0]butane
1-p-tolylsulfonylbicyclo[1.1.0]butane
1-N-ethylcarbamoylbicyclo[1.1.0]butane
1-N,N-dimethylcarbamoylbicyclo[1.1.0]butane
1-formylbicyclo[1.1.0]butane
1-(β-hydroxyethyl)bicyclo[1.1.0]butane
1-(β-chloroethyl)bicyclo[1.1.0]butane
2,4-dicyanobicyclo[1.1.0]butane
1,2,3,4-tetracyanobicyclo[1.1.0]butane
2,4-dichlorobicyclo[1.1.0]butane
2,4-bis(methylsulfonyl)bicyclo[1.1.0]butane
2,4-dinitrobicyclo[1.1.0]butane
2,4-diacetylbicyclo[1.1.0]butane
2,4-bis(diethylamino)bicyclo[1.1.0]butane
2,4-bis(n-butoxy)bicyclo[1.1.0]butane
2,4-bis(hydroxy)bicyclo[1.1.0]butane
2,4-dibromobicyclo[1.1.0]butane
2,4-diiodobicyclo[1.1.0]butane
1-acetylbicyclo[1.1.0]butane
sodium bicyclo[1.1.0]butane-1-carboxylate The bicyclobutane monomers used in the copolymerizations are prepared as follows:

The 1-cyano-3-hydrocarbylbicyclo[1.1.0]butanes are prepared by reacting a 1-cyano-3-hydrocarbylidenecyclobutane with hydrogen iodide at 0° C. to 200° C., reacting the resulting 1-cyano-3-iodo-3-hydrocarbylcyclobutane with an alkali metal hydride suspended in a hydrocarbon oil at 0° to 100° C.

1-phenylbicyclo[1.1.0]butane is prepared by irradiating 2-phenylbutadiene with ultraviolet light. It is also prepared by treatment of 3-ketocyclobutanecarboxylic acid with red mercuric oxide and bromine in carbon tetrachloride at 70° C. to obtain 3-bromocyclobutanone. This is treated with phenylmagnesium bromide and the product hydrolyzed to obtain 1-hydroxy-1-phenyl-3-bromocyclobutane. This is treated with zinc chloride in concentrated aqueous hydrochloric acid to obtain 1-chloro-1-phenyl-3-bromocyclobutane. This is treated with magnesium metal in tetrahydrofuran at 25° C. to obtain 1 phenylbicyclo[1.1.0]butane.

1-(p-hydroxyphenyl)bicyclo[1.1.0]butane is prepared by irradiating 2-(p-hydroxyphenyl)butadiene with ultraviolet light. It is also prepared by treating 3-ethoxycyclobutanone with p-methoxyphenylmagnesium bromide and treating the product with concentrated hydrobromic acid to obtain 1-bromo-3-ethoxy-1-p-hydroxyphenylcyclobutane. This is treated with magnesium metal in tetrahydrofuran to obtain 1-(p-hydroxyphenyl)bicyclo[1.1.0]butane.

1-(p-chlorophenyl)bicyclo[1.1.0]butane is prepared by irradiating 2-(p-chlorophenyl)butadiene with ultraviolet light. It is also prepared by using p-chlorophenylmagnesium bromidei n place of phenylmagnesium bromide in the procedure described above for preparing 1-phenylbicyclo[1.1.0]butane.

1-ethylthiocarbonylbicyclo[1.1.0]butane is prepared by ester interchange of 1-methoxycarbonylbicyclo[1.1.0]butane with ethyl mercaptan.

1-chlorobicyclo[1.1.0]butane is prepared by irradiating 2-chlorobutadiene with ultraviolet light. It is also prepared by treating 3-t-butoxycyclobutanone with PCl$_5$ to obtain 1,1,3-trichlorocyclobutane which on treatment with magnesium yields 1-chlorobicyclo[1.1.0]butane.

3-chloro-1-methoxycarbonylbicyclo[1.1.0]butane is prepared by treatment of 3-methoxycarbonylcyclobutanone with PCl$_5$ and dehydrochlorinating the resulting 3,3-dichloro-1-methoxycarbonylcyclobutane by the action of potassium t-butoxide in ether.

1-methoxybicyclo[1.1.0]butane is prepared by irradiating 2-methoxybutadiene with ultraviolet light. It is also prepared by treating 3-bromocyclobutanone with trimethyl orthoformate to obtain the dimethyl ketal which is treated with magnesium to obtain 1-methoxybicyclo[1.1.0]butane.

1-acetoxybicyclo[1.1.0]butane is prepared by irradiating 2-acetoxybutadiene with ultraviolet light. It may also be prepared by peracid oxidation of 1-acetylbicyclo[1.1.0]butane.

1-nitrobicyclo[1.1.0]butane is prepared by treating 1-chloro-3-bromocyclobutane with silver nitrite and dehydrochlorinating the resulting 1-chloro-3-nitrocyclobutane by the action of potassium t-butoxide in ether.

1-p-tolylsulfonylbicyclo[1.1.0]butane is prepared by treating 1-chloro-3-bromocyclobutane with sodium p-tolylsulfinate and dehydrochlorinating the resulting 1-chloro-3-p-tolylsulfonylcyclobutane by the action of potassium t-butoxide in ether.

1-(N-ethylcarbamoyl)bicyclo[1.1.0]butane is prepared by reaction of 1-methoxycarbonylbicyclo[1.1.0]butane with ethylamine.

1-(N,N-dimethylcarbamoyl)bicyclo[1.1.0]butane is prepared by reaction of 1-methoxycarbonylbicyclo[1.1.0]butane with dimethylamine.

1-formylbicyclo[1.1.0]butane is prepared by treating 3-chlorocyclobutanecarbonitrile with lithium tributoxy aluminum hydride and dehydrochlorinating the resulting 1-formyl-3-chlorocyclobutane by the action of potassium t-butoxide in ether.

1-(β-hydroxyethyl)bicyclo[1.1.0]butane is prepared by reacting 4-hydroxybut-1-yne with two equivalents of diazomethane in the presence of ultraviolet light or a copper catalyst. 1-(β-chloroethyl)bicyclo[1.1.0]butane is similarly prepared from 4-chlorobut-1-yne.

2,4-dicyanobicyclo[1.1.0]butane is prepared by treating acetylene with two equivalents of diazoacetonitrile.

1,2,3,4-tetracyanobicyclo[1.1.0]butane is prepared by treating dicyanoacetylene with two equivalents of diazoacetonitrile.

2,4-dichlorobicyclo[1.1.0]butane is prepared by treating acetylene with two equivalents of chlorodiazomethane.

2,4-bis(methylsulfonyl)bicyclo[1.1.0]butane is prepared from 2,4-dichlorobicyclo[1.1.0]butane by the action of sodium methylsulfinate.

2,4-dinitrobicyclo[1.1.0]butane is prepared by treating 2,4-dichlorobicyclo[1.1.0]butane with silver nitrite.

2,4-diacetylbicyclo[1.1.0]butane is prepared by treating acetylene with two equivalents of diazoacetone.

2,4-bis(diethylamino)bicyclo[1.1.0]butane is prepared from 2,4-dichlorobicyclo[1.1.0]butane by the action of diethylamine.

2,4-bis(n-butoxy)bicyclo[1.1.0]butane is prepared by treating 2,4-dichlorobicyclo[1.1.0]butane with potassium n-butoxide.

2,4-bis(hydroxy)bicyclo[1.1.0]butane is prepared by treating 2,4-dichlorobicyclo[1.1.0]butane with a base such as potassium hydroxide.

2,4-dibromobicyclo[1.1.0]butane is prepared by treating 2,4-dichlorobicyclo[1.1.0]butane with lithium bromide in acetone.

2,4-diiodobicyclo[1.1.0]butane is prepared by treating 2,4-dichlorobicyclo[1.1.0]butane with lithium iodide in acetone.

1 - acetylbicyclo[1.1.0]butane is prepared by treating 3-chloro-1-cyanocyclobutane with methylmagnesium bromide and reacting the resulting 1-acetyl-3-chlorocyclobutane with sodium hydride in N-methylpyrrolidone.

Sodium bicyclo[1.1.0]butane-1-carboxylate is prepared by hydrolysis of 1-methoxycarbonylbicyclo[1.1.0]butane with sodium hydroxide.

Preferred bicyclo[1.1.0]butane monomers, because of availability, are those wherein $R^1$ is selected from hydrogen, halogen (preferably chlorine), hydroxyloweralkyl, hydroxyphenyl, haloloweralkyl (preferably chloroloweralkyl), halophenyl (preferably chlorophenyl), —COOH, —COO-loweralkyl, —COS-lower alkyl, —COO alkali metal, —CONH$_2$, —CONH-lower alkyl, —CON (loweralkyl)$_2$, —SO$_2$-phenyl, —CHO, —CO-loweralkyl, —OCO-loweralkyl, —O-loweralkyl, —NO$_2$, —CN, loweralkyl or phenyl; $R^2$ is selected from hydrogen, halogen (preferably chlorine), —COO-loweralkyl, cyano, alkyl of up to 18 carbon atoms, phenyl or loweralkylphenyl; $R^3$ is selected from hydrogen, halogen, —COO-loweralkyl, —COOH, loweralkyl, benzyl, naphthyl, cyclohexyl-loweralkyl, cyano, —SO$_2$-loweralkyl, nitro, —CO-loweralkyl, —N (loweralkyl)$_2$, —O-loweralkyl, or hydroxy; $R^4$ is selected from hydrogen, halogen, loweralkyl, or phenyl; $R^5$ is selected from hydrogen, halogen, —COO-loweralkyl, loweralkyl, cyclohexyl, cyano, —CO$_2$-loweralkyl, nitro, —CO-loweralkyl, —N(loweralkyl)$_2$, —O-loweralkyl, or hydroxy; and $R^6$ is selected from hydrogen, halogen, or loweralkyl.

Even more preferred because of availability are those bicyclo[1.1.0]butanes wherein $R^1$ is selected from hydrogen, cyano, —COOR, —CONH$_2$, —COR, —OCOR, —SO$_2$R, —OR or R wherein R is defined as previously but preferably is loweralkyl; $R^2$ is selected from hydrogen, cyano, —COOR, —COR, —OCOR lower alkyl and halogen wherein R is defined as in $R^1$; and $R^3$, $R^4$, $R^5$ and $R^6$ are selected from hydrogen, up to four halogens, and up to two groups selected from methyl, ethyl, cyano and —COOR wherein R is defined as in $R^1$. Of these bicyclo[1.1.0]butanes, most preferred are those wherein $R^1$ is cyano or methoxycarbonyl, $R^2$ is lower alkyl or methoxycarbonyl, and $R^3$ through $R^6$ are each hydrogen.

Especially preferred bicyclo[1.1.0]butanes are those wherein $R^1$ is cyano and $R^2$ is selected from hydrogen or lower alkyl, especially methyl, and $R^3$ through $R^6$ are each hydrogen. Of these, most preferred are those wherein $R^1$ is cyano and $R^2$ is hydrogen.

In addition, those copolymers wherein $R^1$ is cyano and $R^2$ is hydrogen have very high molecular weights, having inherent viscosities of 1.2 or more.

Preferred unsaturated polymerizable comonomers are acrylonitrile, styrene, vinyl acetate, methyl methacrylate, vinyl chloride, vinyl fluoride, 2-methyl-5-vinyl pyridine and sodium styrene sulfonate.

As shown in the examples, the copolymers of this invention are tough and non-brittle, and are useful as molded objects, as films for wrapping and packaging, as translucent and transparent glazing materials, as protective coatings applied from melt or solution and as fibers in conventional fiber applications.

For example, solutions of the copolymer of Example 6 in trifluoroacetic acid can be used to prepare clear, self-supporting films by conventional casting techniques, or the films can be cast directly on to wood or metal substrates to provide tough, adhering, protective coatings for the substrates. Moreover, solutions of this copolymer in dimethylformamide can be spun into fibers which are useful in many conventional fiber applications.

The methyl methacrylate copolymers of Examples 22–25 exhibit higher glass transition temperatures and greater thermal stability properties than methyl methacrylate homopolymers or ethyl acrylate/methyl methacrylate copolymers containing 1.0, 2.0 and 2.5 weight percent ethyl acrylate.

The ethyl acrylate/methyl methacrylate copolymers are especially preferred polymers for applications requiring higher glass transition temperature and greater thermal stability. The methyl methacrylate copolymers of this invention containing about 1–4 weight percent polymerized 1-cyanobicyclo[1.1.0]butane are even more preferred for these applications because they possess even better thermal properties.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A copolymer comprising
   (1) from 1–99 mole percent of at least one cyclobutylene repeating unit of the formula

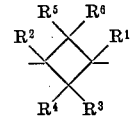

wherein:
   $R^1$ and $R^2$ are each selected from the class consisting of hydrogen, halogen, hydroxyloweralkyl, hydroxyphenyl loweralkoxyloweralkyl, loweralkoxyphenyl, haloloweralkyl, halophenyl, —COOH, —COOR, —COSR, —COOM, —CONH$_2$, —CONHR, —CONR$_2$, —SO$_2$R, —CHO, —COR, —OCOR, —OR, —NO$_2$, —CN, and R, wherein M is one equivalent of a metal cation selected from the class consisting of elements of atomic number 3, 4, 11–13, 19–32, 37–51, 55–84 and 87–103, and wherein R is hydrocarbyl of up to 18 carbon atoms free of ethylenic and acetylenic carbon-to-carbon unsaturation; and
   $R^3$, $R^4$, $R^5$ and $R^6$ are each selected from the class consisting of hydroxy, amino, —NR$_2$ and $R^1$;

(2) the remainder being at least one repeating unit of the formula

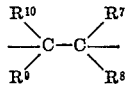

wherein $R^7$ is defined the same as $R^1$; $R^8$ is selected from the class consisting of hydrogen, halogen, cyano, vinyl, methyl pyridinyl, phenylene sodium sulfonate, and lower alkyl; $R^9$ is selected from the class consisting of hydrogen, halogen and —COOR wherein R is defined as above; $R^{10}$ is selected from the class consisting of hydrogen and halogen; when $R^7$ and $R^{10}$ are hydrogen, $R^9$ and $R^8$ can be joined together to form an alkylene group of 2–4 carbon atoms or a 1,3-cyclopentylene group; and when $R^7$ and $R^8$ are hydrogen or methyl, $R^9$ and $R^{10}$ taken together can be joined to form a group of the formula

2. The copolymer of claim 1 containing 4–99 mole percent of at least one bicyclo[1.1.0]butylene repeating unit.

3. The copolymer of claim 1 wherein, in component (1), $R^1$ is selected from the class consisting of hydrogen, cyano, —COOR, —CONH$_2$, —COR, —OCOR, —SO$_2$R, —OR and R wherein R is lower alkyl; $R^2$ is selected from the class consisting of hydrogen, cyano, —COOR, —COR, —OCOR and halogen wherein R is lower alkyl; and $R^3$, $R^4$, $R^5$ and $R^6$ each are selected from the class consisting of hydrogen, halogen, and up to two groups selected from methyl, ethyl, cyano and —COOR wherein R is lower alkyl.

4. The copolymer of claim 3 wherein $R^1$ is selected from the class consisting of cyano and —COOR, $R^2$ is selected from the class consisting of hydrogen and lower alkyl, and $R^3$, $R^4$, $R^5$ and $R^6$ are each hydrogen.

5. The copolymer of claim 4 wherein $R^1$ is cyano and $R^2$ is hydrogen.

6. The copolymer of claim 1 in the form of a fiber.

7. The copolymer of claim 1 wherein $R^7$ is selected from the class consisting of hydrogen, cyano, acyl and acyloxy of 2–12 carbon atoms, alkoxy of 1–18 carbon atoms, alkoxycarbonyl of 2–19 carbon atoms, alkoxy of 1–18 carbon atoms, methyl pyridinyl, phenylene sodium sulfonate, chlorine, fluorine, and R is defined as in claim 1; $R^8$ is selected from the class consisting of hydrogen, halogen, cyano, vinyl and lower alkyl; and $R^9$ and $R^{10}$ are hydrogen.

8. The copolymer of claim 1 wherein $R^8$ is selected from the class consisting of cyano,

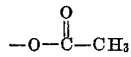

chlorine, fluorine, methyl pyridinyl and phenylene sodium sulfonate and $R^7$, $R^9$ and $R^{10}$ are hydrogen.

9. The copolymer of claim 1 wherein $R^7$ is phenyl and $R^8$, $R^9$ and $R^{10}$ are hydrogen.

10. The copolymer of claim 1 wherein $R^7$ is

$R^8$ is methyl and $R^9$ and $R^{10}$ are hydrogen.

11. The copolymer of claim 1 wherein $R^1$ is cyano, $R^2$ is methyl, $R^3$, $R^4$, $R^5$, $R^6$, $R^8$, $R^9$, $R^{10}$ are hydrogen and $R^7$ is cyano.

12. The copolymer of claim 1 wherein $R^1$ is cyano, $R^7$ is cyano and $R^2$, $R^3$, $R^4$, $R^5$, $R^6$, $R^8$, $R^9$, and $R^{10}$ are hydrogen.

13. The copolymer of claim 12 having an inherent viscosity of more than 0.5.

14. The copolymer of claim 1 wherein $R^1$ is cyano, $R^7$ is phenyl and $R^2$, $R^3$, $R^4$, $R^5$, $R^6$, $R^8$, $R^9$, and $R^{10}$ are hydrogen.

15. The copolymer of claim 1 wherein $R^1$ is cyano, $R^7$ is COOCH$_3$, $R^8$ is methyl and $R^2$, $R^3$, $R^4$, $R^5$, $R^6$, $R^9$ and $R^{10}$ are hydrogen.

16. The copolymer of claim 1 wherein $R^1$, $R^2$ and $R^7$ are methoxycarbonyl, $R^8$ is methyl and $R^3$, $R^4$, $R^5$, $R^6$, $R^9$, and $R^{10}$ are hydrogen.

References Cited

UNITED STATES PATENTS 3,234,264  2/1966  Blanchard.

OTHER REFERENCES

Ciula: Dissertation Abstracts, 21, 50–1 (1960).

Frey and Stevens: Trans. Faraday Soc., 6190–4 (1965).

Lemal et al.: J. Amer. Chem. Society, 85, 2529–30 (1963).

Wiberg: Record of Chem. Progress, 26, 143–54 (1965) September.

Wieberg and Ciula: J. Amer. Chem. Society, 81, 5261–2 (1959).

Wieberg et al.: Tetrahedron 21, 2749–69 (1965).

JOSEPH L. SCHOFER, Primary Examiner

J. KNIGHT III, Assistant Examiner

U.S. Cl. X.R.

260—2, 78.5, 80.77, 80.81, 82.1, 85.5, 85.7, 86.1, 87.5, 87.7, 88.1; 117—161